UNITED STATES PATENT OFFICE.

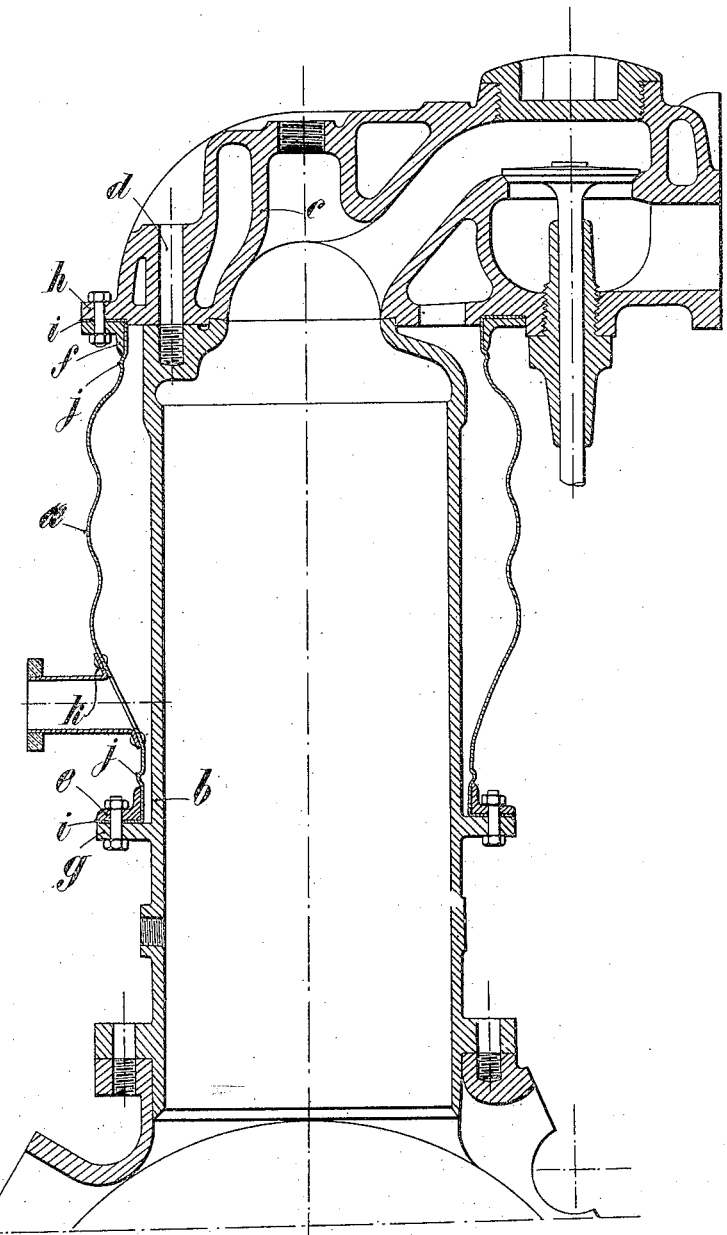

TONY HUBER, OF BILLANCOURT, FRANCE.

JACKETED MOTOR-CYLINDER.

No. 828,656.            Specification of Letters Patent.            Patented Aug. 14, 1906.

Application filed August 8, 1904. Serial No. 220,018.

*To all whom it may concern:*

Be it known that I, TONY HUBER, engineer, a citizen of the French Republic, residing at Billancourt, Seine, France, have invented certain new and useful Improvements in Jacketed Motor-Cylinders, of which the following is a specification.

This invention relates to the construction of motor-cylinders made of steel or other metal and provided with a water-jacket of sheet-copper or aluminium or the like attached to the cylinder, and has for its object to dispense with soldering or brazing in connecting the cylinders with their jackets.

In the accompanying drawing, which forms a part of this specification, a motor-cylinder in accordance with this invention is shown in sectional elevation.

The circulating water-jacket $a$ is connected at its lower part to the cylinder $b$ and at its upper part to the cylinder-head $c$, which is connected to the cylinder by a joint consisting of two flat or slightly conical well-ground surfaces kept in contact by bolts or studs $d$; but the cylinder-head may be attached to the cylinder in any other suitable manner or even cast therewith. The jacket is connected to the cylinder and cylinder-head by means of two collars $e\ f$, of steel, bronze, or brass, the collar $e$ being bolted to a flange $g$, provided on the cylinder, while the collar $f$ is bolted to a flange $h$ on the cylinder-head.

In order to connect the rigid collars with the elastic casing of the jacket without resorting to soldering or brazing, the jacket is provided with laterally-extending lips $i$, which extend between the collars $e\ f$ and flanges $g\ h$. The jacket $a$ is expanded or swaged, so as to form a bead $j$ in close proximity to that part of the collars $e\ f$ which are in contact with the body portion of the jacket.

When the parts are put together, the lip of the casing is compressed between the collars and flanges on the cylinder and cylinder-head by screwing down the bolts or studs.

The water-inlet flange $k$ may be riveted to the jacket, as shown, or it may be fixed to the edges of the opening in the same manner as the jacket is fixed to the cylinder-head and cylinder.

Having now particularly described and ascertained the nature of my said invention and in what manner the same is to be performed, I declare that what I claim is—

A water-jacketed cylinder for explosive-engines comprising the combination with a cylinder and a cylinder-head, each of which is provided with a flange, of an expansible and contractible jacket surrounding said cylinder and abutting against the said flanges, collars engaging that portion of the jacket which abuts against the flanges, means extending through the flanges, jacket, and collars for fixedly securing the jacket in position, said jacket having an inlet-opening and further provided with beads adapted to overlap part of said collars, and an inlet-pipe connected to and communicating with the opening through the jacket.

In testimony whereof I have hereunto set my hand in presence of two subscribing witnesses.

TONY HUBER.

Witnesses:
 GAUL BLUM,
 HANSON C. COXE.